R. E. HALL.
ARTIFICIAL TEETH.
APPLICATION FILED NOV. 13, 1916.
1,339,821. Patented May 11, 1920.
FIG. 1.
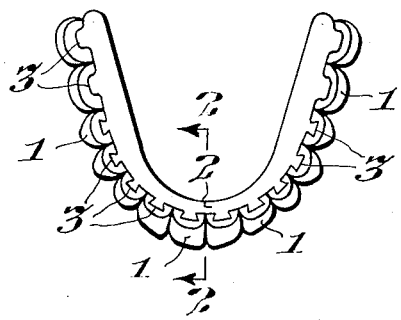
FIG. 2.
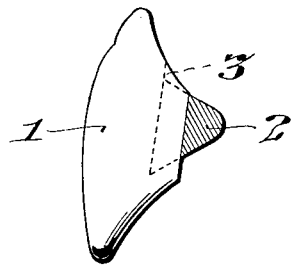
FIG. 3.
FIG. 4.
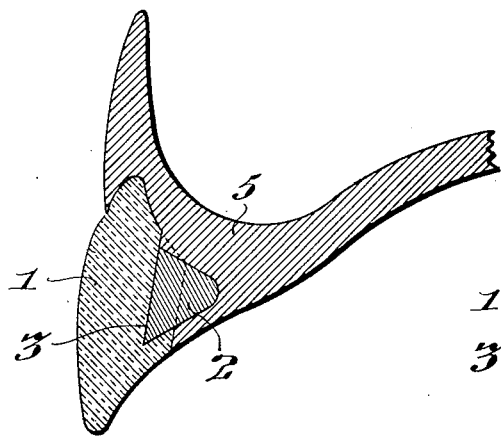
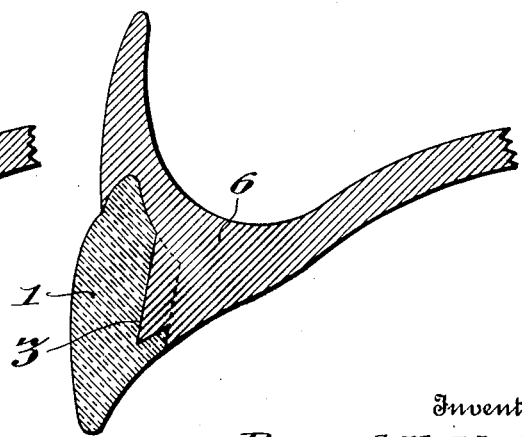
Witness
William J. Russell
Inventor
Rupert E. Hall,
By Clifton C. Callowell
Attorney

UNITED STATES PATENT OFFICE.

RUPERT E. HALL, OF PHILADELPHIA, PENNSYLVANIA.

ARTIFICIAL TEETH.

1,339,821.   Specification of Letters Patent.   Patented May 11, 1920.

Application filed November 13, 1916. Serial No. 131,175.

*To all whom it may concern:*

Be it known that I, RUPERT E. HALL, a citizen of the United States, and a resident of Philadelphia, in the county of Philadelphia, State of Pennsylvania, have invented certain new and useful Improvements in Artificial Teeth, of which the following is a specification, reference being had to the accompanying drawings.

My invention relates particularly to that class of artificial teeth that are adapted to be carried by a mounting or plate fitted to the gums of the wearer and retained in the mouth by suction or adhesion.

As is well known, teeth of this type have heretofore been manufactured individually and sold separately to the dentist for the purpose of making up sets of teeth for each individual patient, which required his time and skill in setting up the separate teeth upon the wax model prior to casting the mold, and even with the most skilled operator teeth thus set require more or less grinding to produce proper articulation.

The principal objects of my invention are, to avoid the difficulties and inaccuracies incident to the setting up of separate teeth for each individual case, by providing artificial teeth so assembled and connected as a unit in manufacture as to insure their correct anatomical relation in the dental arch, and perfect articulation when mounted to form the completed denture.

Other objects of my invention are, to greatly facilitate the mounting of such teeth, consequently reducing the cost of production of the denture, by providing a dental arch unit in which the teeth have been set up and articulated before mounting upon the model.

My invention further comprehends such an arrangement of the teeth as to afford a trial fitting upon the gums of the patient prior to mounting them upon the wax model.

Specifically stated, the form of my invention as hereinafter described comprises a dental arch unit in which artificial teeth are assembled in sequence corresponding with the natural teeth of the dental arch, and securely connected together to retain their proper relation while being mounted upon the model, in such a manner as to not interefere with the forming of the mold.

My invention also includes all of the various novel features of construction and arrangement as hereinafter more definitely specified.

In the accompanying drawings, Figure 1 is a plan view of a dental arch unit constructed in accordance with my invention; Fig. 2 is an enlarged central transverse sectional view of the dental arch unit shown in Fig. 1, taken on the line 2—2 in said figure; Fig. 3 is a central vertical sectional view of the tooth shown in Fig. 2, showing the connecting bar of the dental arch unit and the wax model built over said bar; and Fig. 4 is a view similar to Fig. 3, showing the tooth engaged with the vulcanite plate or mounting, the model comprising the wax form and embedded connecting bar having been melted out.

In said figures, the teeth 1, which have been set to conform to a typical dental arch, are connected by the bar 2, forming a skeleton frame which is engaged with their anchor recesses 3, and which may preferably be formed of a low fusible metal or other suitable material, capable of being melted or dissolved with the wax model 5, shown in Fig. 3.

The model denture thus formed may be employed in the usual and well-known manner to form a mold in which, after the wax model and bar have been melted or dissolved, the rubber may be packed to form the vulcanite plate or mounting 6, as shown in Fig. 4.

It will be obvious that dental arch units constructed in accordance with my invention may be produced by the manufacturer, having the teeth anatomically related and perfectly articulated according to a predetermined standard, so that the dentist is relieved of the labor of setting up the individual teeth, which requires the hand of a skilful operator, and the subsequent grinding to produce the perfect articulation, which is extremely nerve racking and monotonously laborious.

It may be here noted that the unit thus formed may be readily fitted to the gums of the patient to ascertain by trial its general appearance with respect to the general characteristics of the individual.

Furthermore, the bar 2 may be formed of such pliant material that the dental arch unit may be bent to conform to the shape, size and general characteristics of the model of each particular case, without noticeably affecting the relation or articulation of the teeth.

It is peculiarly convenient to make the connecting bar 2 of low fusible material, so that it can be incorporated in and practically become part of the wax model and can be dissipated at the same time the wax model is removed. When the bar 2 is made by the dental supply house it is preferable to use the low fusing metal because of its stiff and relatively permanent character. The ease with which teeth can be placed in proper anatomical position in a structure like the bar 2 may make it desirable for dentists to arrange the false teeth upon such a bar, so that the whole set can be transferred in proper relative position to the wax model. In such case the bar 2 can be made of less substantial material.

The method of producing a set of artificial teeth constructed in accordance with my invention may be accomplished by setting the teeth in a suitable form, in sequence with the natural dental arch, connecting said teeth by a relatively thin bar in anatomical relation, mounting said teeth as a unit upon a wax model, forming a mold thereby, removing the wax, packing the mold with rubber, and vulcanizing said rubber.

I do not desire to limit my invention to the precise details of construction and arrangement as herein set forth, as it is obvious that various modifications may be made therein without departing from the essential features of my invention as defined in the appended claims.

Having thus described my invention, I claim:

1. In combination, a plurality of teeth set in proper anatomical relation and a flexible temporary support for said teeth, to which they are firmly attached so as to be incapable of relative movement except as the support is bent, said support being adapted to be incorporated with and to become a part of the wax pattern for a dental plate and to be removed from the mold contemporaneously with the removal of the wax pattern.

2. In combination, a plurality of teeth set in proper anatomical relation and a temporary support of low fusible material to which said teeth are attached, said support being adapted to be incorporated with the wax forming the pattern for a tooth plate and to be melted when the wax of the pattern is melted.

3. The method including the following steps: first, setting a plurality of teeth in proper anatomical order, connecting said teeth by a temporary support to which said teeth are attached, mounting said teeth upon a wax pattern of the ultimate dental plate and incorporating the temporary support into the body of said pattern, forming a mold around both pattern and temporary support and subsequently removing by heat both the pattern and temporary support.

In witness whereof, I have hereunto set my hand this 13th day of November, A. D., 1916.

RUPERT E. HALL.

Witnesses:
WILLIAM J. RUSSELL,
CLIFTON C. HOLLOWELL.